F. M. JONES.

Improvement in Monuments.

No. 121,380.

Patented Nov. 28, 1871.

UNITED STATES PATENT OFFICE.

FRANCIS MARIN JONES, OF INDEPENDENCE, MISSISSIPPI.

IMPROVEMENT IN MONUMENTS.

Specification forming part of Letters Patent No. 121,380, dated November 28, 1871.

*To all whom it may concern:*

Be it known that I, FRANCIS MARIN JONES, of Independence, in the county of De Soto and State of Mississippi, have invented a new and valuable Improvement in Tombstones; and I do hereby declare that the following is a full, clear, and exact description of the construction and operation of the same, reference being had to the annexed drawing making a part of this specification, and to the letters and figures of reference marked thereon, in which—

Figure 1:
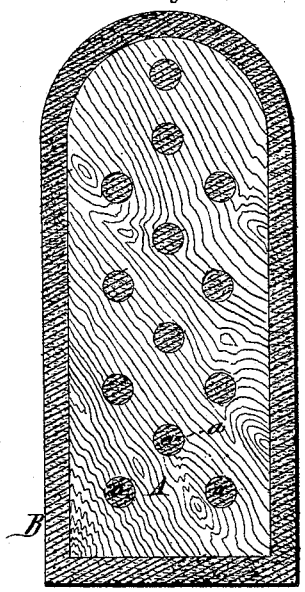
Figure 2:
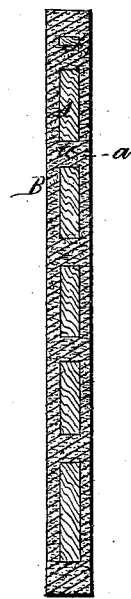

Fig. 1 of the drawing is a representation of a vertical longitudinal section of my invention. Fig. 2 is a cross section of the same.

This invention has relation to the manufacture of tombstones; and the novelty consists in constructing a tombstone of wood and cement, as hereinafter described.

In the drawing, A represents a board of any suitable size or shape, through which I bore any number of holes, *a*, and then cover with any suitable cement, B, to imitate stone, to the depth of about one inch. I shape the cement while it is wet and pliable to any desirable style of ornamentation, and press or raise on its surface any appropriate inscription. The cement becomes hard by drying, and is very durable, being exposed to no rough usage. The perforated board forms a support to the cement, which adheres to it firmly, the cement entering and closing up the openings *a*. It is estimated that ornamented tombstones and monuments may be made according to the method described at about one-tenth or even less than one-tenth the cost of cut tombstones of similar style and appearance.

I claim as my invention—

The tombstone or monument constructed of perforated wood A, covered with cement B, as and for the purpose set forth.

In testimony that I claim the above I have hereunto subscribed my name in the presence of two witnesses.

FRANCIS MARIN JONES.

Witnesses:
J. R. SANDIDGE,
J. L. GRAHAM. (54)